Nov. 22, 1932.  A. S. MOIR  1,888,210
AGRICULTURAL REAPING MACHINE
Filed Oct. 29, 1931  2 Sheets-Sheet 1

Inventor
Alexander Sands Moir
By Pennie, Davis, Marvin & Edmonds
Attorneys

Nov. 22, 1932.  A. S. MOIR  1,888,210
AGRICULTURAL REAPING MACHINE

Filed Oct. 29, 1931   2 Sheets-Sheet 2

Inventor
Alexander Sands Moir
By Pennie, Davis, Marvin & Edmonds
Attorneys

Patented Nov. 22, 1932

1,888,210

UNITED STATES PATENT OFFICE

ALEXANDER SANDS MOIR, OF STIRLING, SCOTLAND

AGRICULTURAL REAPING MACHINE

Application filed October 29, 1931. Serial No. 571,787.

This invention relates to improvements in agricultural reaping machines of the type including a forwardly directed rotary cone located at the outer end of the cutter and adapted, in the travel of the machine, to turn over the cut crop.

The present invention aims to provide an improved arrangement whereby to ensure that heavy crop is turned over with certainty. According to the invention the cone is provided with crop-entraining means adapted to be brought into timed operation in the rotation of the cone.

Figure 1:
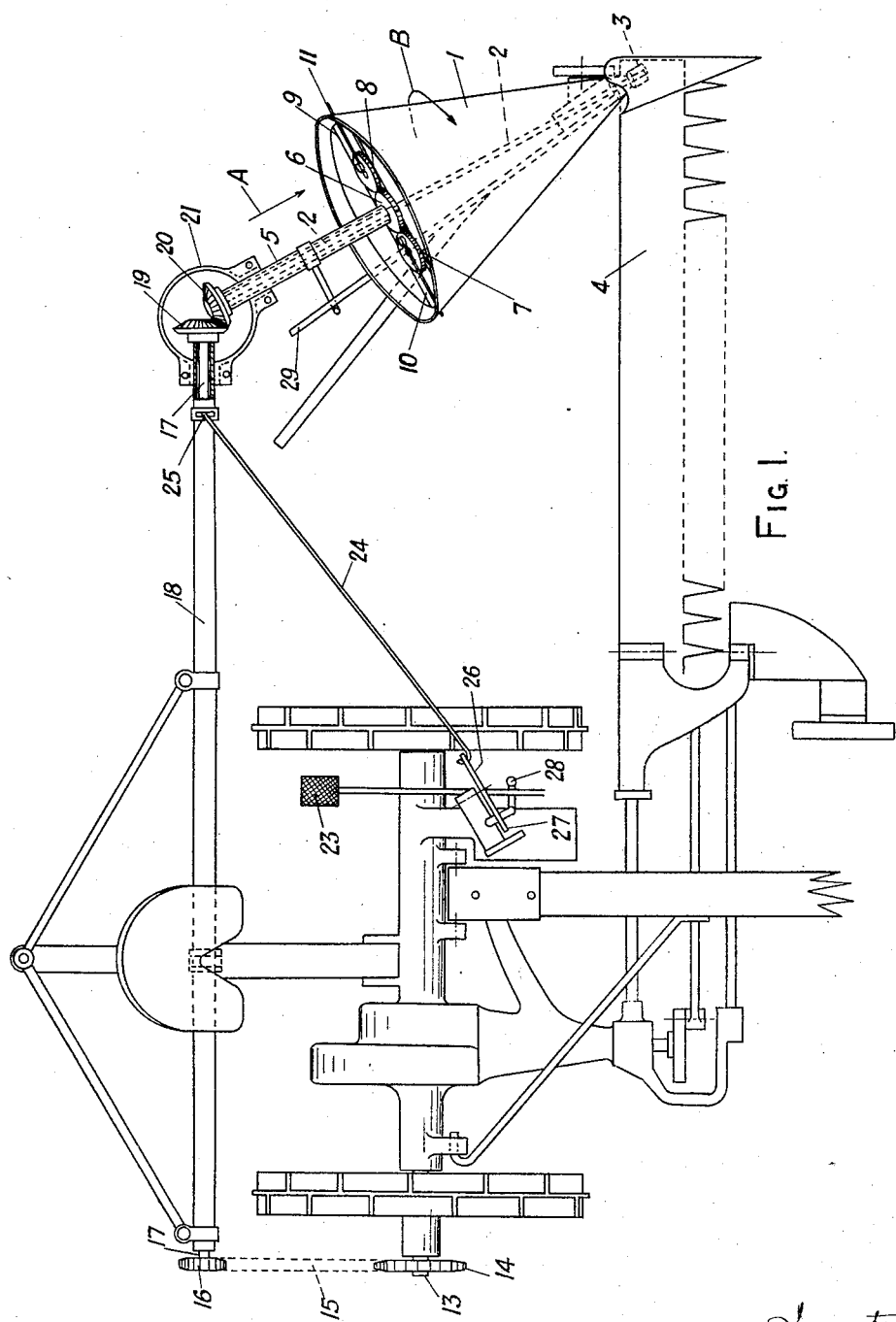
Figure 2:
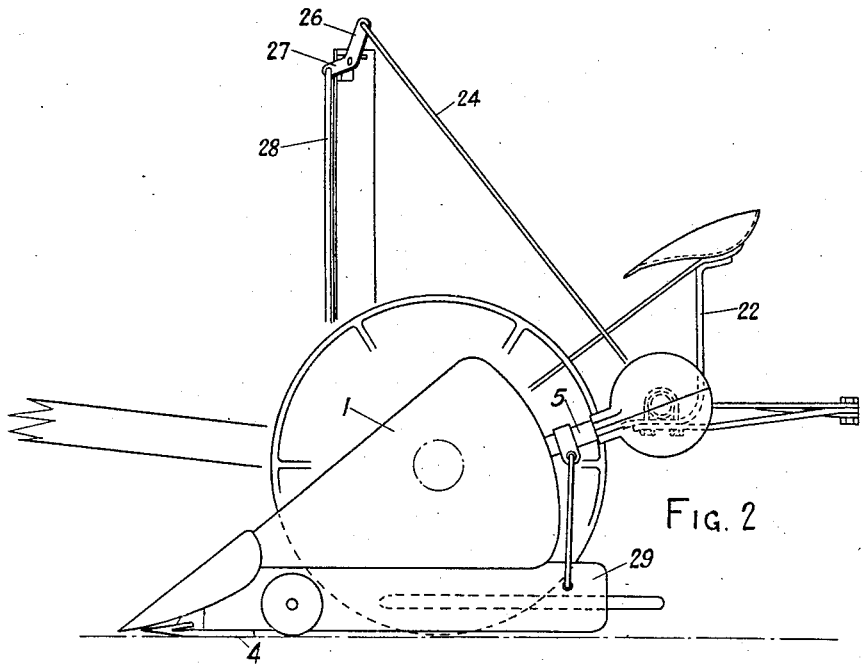
Figure 3:
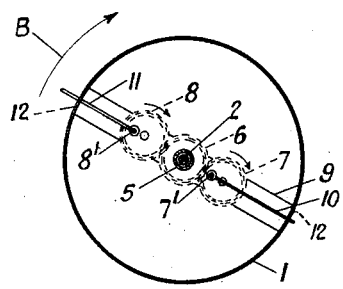

In the accompanying drawings Fig. 1 is a plan view and Fig. 2 a fragmentary side elevation of a reaping machine embodying the invention, Fig. 3 is a fragmentary elevation of the rotary cone as viewed in the direction indicated by the arrow "A" Fig. 1.

Referring to the drawings, the rotary cone 1 is secured on a shaft 2 extending axially of the cone and journalled at the apex end of the cone in a bearing 3 carried on the outer end of the reaper cutter 4. The rear portion of the shaft 2 exterior of the cone 1 is sleeved by a non-rotary tube 5 on the forward end of which is secured a sun pinion wheel 6 meshing with planetary pinion wheels 7, 8 mounted on a bar 9 carried by the cone 1. The pinion wheels 7, 8 are provided with crankpins 7', 8' respectively, operatively engaged by the inner ends of rods 10, 11 the outer ends of which are guided in apertures 12 in the lateral wall of the cone.

The arrangement is such that, in the rotation of the cone 1 in the direction indicated by the arrow B, the rods 10, 11 are reciprocable radially of the cone 1 whereby their outer ends are alternately projected and retracted with respect to the outer surface of the cone, the pinions 6—8 being so arranged that the rods are caused to project beyond the cone when ascending on that side of the cone remote from the reaper, whereby to entrain heavy crop not influenced in the ordinary way by the cone.

The cone 1 is driven from the axle shaft 13 of the reaper through a train including a sprocket wheel 14 secured on the shaft 13 and wrapped by a chain 15 which also wraps a sprocket pinion 16 secured on one end of a countershaft 17 journalled within a tube 18 and carrying on its other end a bevel pinion 19 meshing with a bevel pinion 20 secured on the rear end of the cone shaft 2, the pinions 19, 20 being enclosed in a casing 21 which rigidly interconnects the tubes 5, 18. The tube 18 is so supported from the seat-supporting structure 22 of the reaper that it is free to perform slight tilting movement when the cutter 4 is raised in the usual manner by depression of the usual foot-lift lever 23. To cause the tube 18 to participate in the movements of the lever 23 a link 24 connected to the tube 18 at 25 is connected to one arm 26 of a bell-crank lever 26, 27 whose other arm 27 is connected through a link 28 to the foot-lift lever 23.

29 denotes the usual swath board in position beneath the cone 1.

I claim:

1. In an agricultural reaping machine, the combination with a cutter of a forwardly directed rotary cone located at the outer end of said cutter, and crop-entraining means including sun-and-planet gear mechanism incorporated in said cone and rods adapted to be projected radially of said cone beyond the outer surface of said cone.

2. In an agricultural reaping machine, the combination with a cutter of a shaft supported at its ends and journalled at one end in said cutter, a forwardly directed rotary cone located at the outer end of said cutter and carried by said shaft, a nonrotary tube sleeving said shaft, and crop-entraining means incorporated in said cone and including a sun pinion secured on said tube, planetary pinions meshing with said sun pinion and carried by said cone, rods reciprocable radially of said cone and operatively connected to said planetary pinions so that, in the rotation of said cone, the outer ends of said rods are projected beyond the outer surface of said cone, substantially as and for the purpose set forth.

In testimony whereof I have signed my name to this specification.

ALEXANDER SANDS MOIR.